United States Patent
Clark et al.

(10) Patent No.: US 6,279,405 B1
(45) Date of Patent: Aug. 28, 2001

(54) APPARATUS AND METHOD FOR A PRESSURE MONITORING DEVICE

(76) Inventors: Kenneth K. Clark, 3019 S. Madison, Tulsa, OK (US) 74114; Charles D. Totty, 3370 W. Seminole, Duncan, OK (US) 73533

( * ) Notice: Subject to any disclaimer, the term of this patent is extended or adjusted under 35 U.S.C. 154(b) by 0 days.

(21) Appl. No.: 09/327,771

(22) Filed: Jun. 7, 1999

(51) Int. Cl.$^7$ .................................................. G01F 1/34
(52) U.S. Cl. .............................. 73/861.42; 73/861.52; 73/861.58; 73/32 R
(58) Field of Search ........................... 73/861.42, 861.52, 73/861.58, 32 R

(56) References Cited

U.S. PATENT DOCUMENTS

| | | | |
|---|---|---|---|
| 3,355,949 | 12/1967 | Elwood et al. | 73/345 |
| 3,561,832 | 2/1971 | Karrer et al. | 310/9.6 |
| 4,326,423 * | 4/1982 | Hartemann | 73/861.63 |
| 4,361,050 * | 11/1982 | Coussot et al. | 73/861.47 |
| 4,455,874 | 6/1984 | Paros | 73/704 |
| 4,455,875 | 6/1984 | Guimard et al. | 73/708 |
| 4,607,530 | 8/1986 | Chow | 73/708 |
| 4,760,351 | 7/1988 | Newell et al. | 331/48 |
| 4,802,370 | 2/1989 | EerNisse et al. | 73/702 |
| 4,936,147 | 6/1990 | EerNisse et al. | 73/702 |
| 5,146,174 | 9/1992 | Toliver et al. | 324/727 |
| 5,231,880 | 8/1993 | Ward et al. | 73/702 |
| 5,299,868 | 4/1994 | Dennis et al. | 374/117 |
| 5,302,879 | 4/1994 | Totty et al. | 310/361 |
| 5,515,735 * | 5/1996 | Sarihan | 73/861.47 |
| 5,587,663 | 12/1996 | Roberts et al. | 324/727 |
| 5,594,354 | 1/1997 | Roberts et al. | 324/727 |
| 5,741,961 | 4/1998 | Martin et al. | 73/32 R |

* cited by examiner

*Primary Examiner*—Benjamin R. Fuller
*Assistant Examiner*—Corey D. Mack
(74) *Attorney, Agent, or Firm*—Head, Johnson & Kachigian

(57) ABSTRACT

A differential pressure monitoring device utilizing two crystalline frequency sensors exposed to different pressures for generating two signals which are combined by a frequency mixer. Two offset based frequency crystal sensors are each exposed to different pressures and the resulting frequencies are mixed to measure the pressure differential between the two crystals. When the crystals are exposed to a common pressure, the crystals have an offset based frequency response that is consistent with pressure. When the two crystals are exposed to pressures, the offset frequencies are mixed together to create a differential frequency that is precisely related to the differential in the pressures placed on the two different crystal sensors.

9 Claims, 4 Drawing Sheets

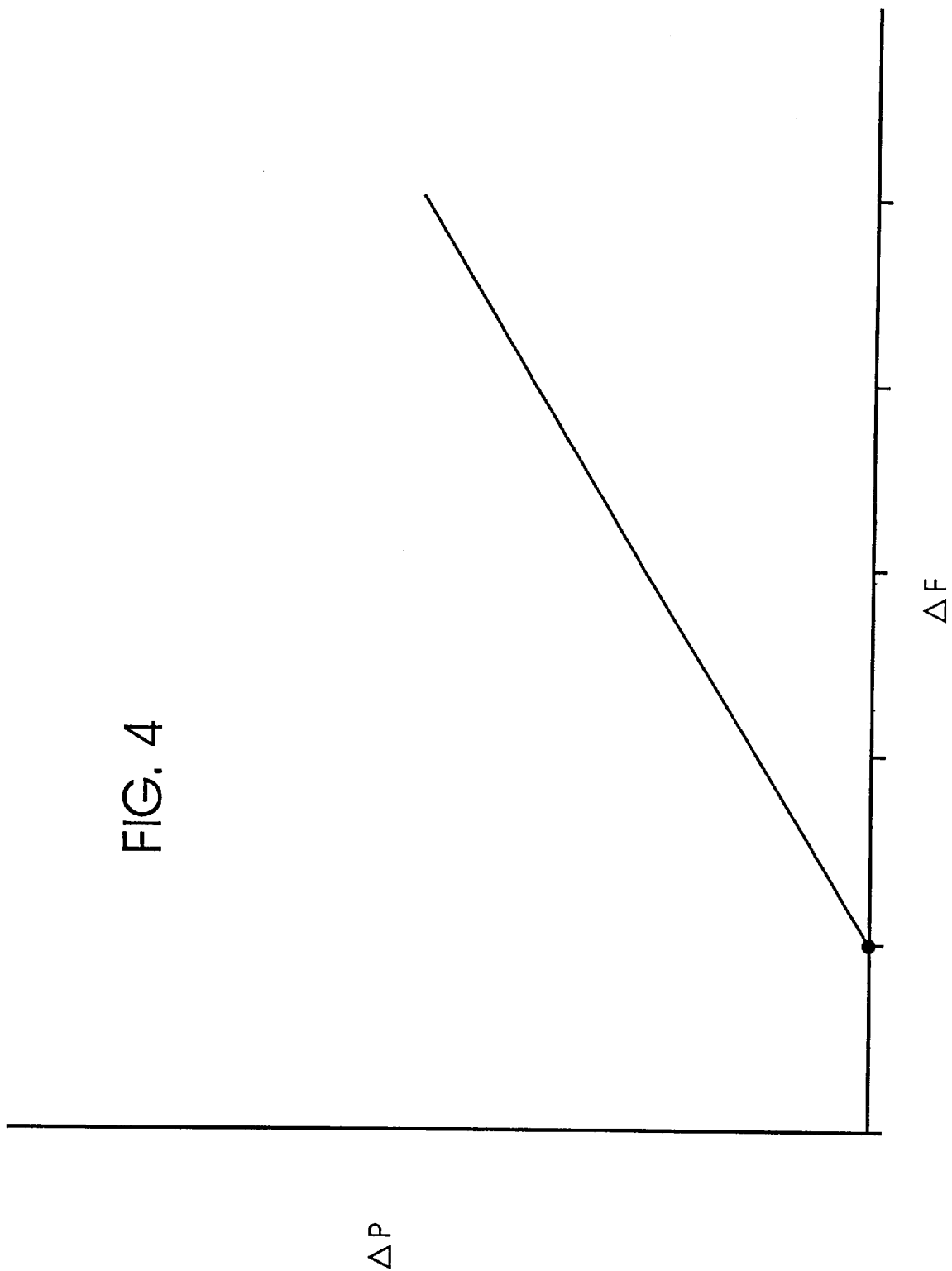

APPARATUS AND METHOD FOR A PRESSURE MONITORING DEVICE

REFERENCE TO PENDING APPLICATIONS

This application is not related to any pending applications.

REFERENCE TO MICROFICHE APPENDIX

This application is not referenced in any microfiche appendix.

BACKGROUND OF THE INVENTION

1. Field of the Invention

The present invention is directed to an apparatus for determining pressure and pressure differentials. More particularly, the invention is directed for use in determining the pressure differentials and fluid density in oil wells. The invention has utility in applications such as high pressure oil well monitoring.

2. Prior Art

In order to monitor and project the production abilities of wells, such as oil wells, it is necessary to gather information about the pressure of the well and the density of the fluid being produced from the well. Information regarding the depth of the oil field, the permeability of the oil producing formation, the head pressure of the well, and the projected oil producing ability and speed of production are necessary to accurately predict and monitor an oil well in order to maximize oil production and profits. Thus, tests are conducted on oil wells to monitor these characteristics and determine the appropriate course of action for maximizing the production of an oil field. The standard methods for measuring the well characteristics and monitoring the production ability of the wells are performed by lowering a pressure monitoring device into the well to monitor characteristics along the depth of the well. The usual method for developing pressure information uses a crystalline detector exposed to the pressure of the well and a second reference crystalline detector which is maintained at a constant pressure. However, these measurements are affected by the temperature variations within the oil well. The known pressure monitoring devices and methods adapt to this temperature change because the reference crystalline detector is maintained in a constant pressure housing which is lowered into the well along with the pressure monitoring crystal so that both crystalline detectors are exposed to the same temperature. Because the housing and encased crystalline reference detector take a different amount of time to react to the temperature changes in the oil well, a waiting period for temperature stabilization is necessary before accurate readings may be taken.

The systems for performing these measurements with crystalline resonators is well known. Quartz resonating systems are described in U.S. Pat. Nos. 3,355,949; 3,561,832; 4,455,875; 4,607,530; 4,802,370; 4,936,147; 5,231,880; 5,299,868 and 5,302,879. Each of these patents is briefly outlined in the following discussion and is hereby incorporated by reference.

U.S. Pat. No. 3,355,949, issued to Elwood et al on Dec. 5, 1967, discloses a crystal temperature and pressure transducer. The specification describes a three crystal temperature and pressure transducer where two crystals are sealed from the effects of pressure and one crystal is exposed to the effects of pressure.

U.S. Pat. No. 3,561,832, issued to Karrer et al on Feb. 9, 1971 discloses a quartz resonator pressure transducer. This specification teaches the construction of a resonator as an intrinsical part of a quartz cylinder. One embodiment of the quartz pressure transducer uses a pair of resonators formed from a single cylindrical core of quartz. In this embodiment, the resonator orientations may be selected to provide maximum, opposite-polarity pressure coefficients of frequency so that the combination of the frequencies will provide a greater pressure sensitivity in a direct beat frequency output without a separate reference crystal. This embodiment also teaches that the temperature-dependent properties of the resonators will be canceled out because both resonators will operate in substantially the same environmental conditions.

U.S. Pat. No. 4,455,875, issued to Guimard et al. on Jun. 26, 1984, discloses a pressure measurement sonde. This invention describes a pressure measurement apparatus which compensates for the effects of the temperature of the surrounding medium. To overcome the drawbacks of temperature variation in the design of the measurement sonde, a heat sink is used along with a heat conductor to equalize the temperature variations between the crystals as rapidly and as effectively as possible in an attempt to balance the heat exchange rate between the two detectors into the surrounding medium.

U.S. Pat. No. 4,607,530, issued to Chow on Aug. 26, 1986, discloses temperature compensation for pressure gauges. The specification describes a method and apparatus for thermally compensating temperature effects on pressure gauges through the use of a fast responding thermal device. The readings of the pressure device are then compensated for by the readings of the thermal device in order to provide a correction to the frequency output of the pressure gauge. This system also utilizes two crystals to measure pressure where one of the crystals is kept at a constant pressure while the other crystal is subjected to an environmental pressure.

U.S. Pat. No. 4,802,370, issued to EerNisse et al. on Feb. 7, 1989 discloses a transducer and sensor apparatus and method. The specification describes an apparatus which includes a pressure sensor, a reference device, and a temperature sensor located within a common environment. For this device, the referenced device and the temperature sensor are constructed to have a temperature response time matched to the temperature response time of the pressure sensor. This allows for compensation for temperature gradient produced by external heating or pressure volume heating. Additional disclosure and claims for this device can be found in U.S. Pat. No. 4,936,147, issued to EerNisse et al. on Jun. 26, 1990 which describes a transducer and sensor apparatus and method.

U.S. Pat. No. 5,231,880, issued to Ward et al on Aug. 3, 1993 discloses a pressure transducer assembly. This specification describes a quartz crystal resonator pressure transducer assembly comprising three crystal resonators. The pressure crystal assembly is immersed in a pressure and temperature transmitting fluid while the temperature and reference crystals are thermally coupled to the fluid but isolated from the pressure by being mounted in a pressure proof enclosure. Electronics are then used to provide a mixed frequency output representative of the pressure and temperature data.

U.S. Pat. No. 5,299,868, issued to Dennis et al on Apr. 5, 1994 discloses a crystalline transducer with an A/C cut temperature crystal. This invention discloses a package that contains a crystal resonator that senses the pressure applied to the housing, along with a crystal resonator that senses the temperature communicated through the housing and a crystal resonator that functions as a reference to compensate for the temperature effects on the pressure sensing resonator. The improvement of this patent discloses a crystalline housing with a crystalline reference resonator mounted in the crystalline housing and a crystalline temperature resonator mounting in the crystalline housing wherein the crystalline temperature resonator is an A/C-cut quartz crystal.

U.S. Pat. No. 5,302,879, issued to Totty et al. on Apr. 12, 1994 discloses a temperature/reference package, and method of using the same for high pressure, high temperature oil or gas well. This specification teaches an improved dual crystal resonator package which includes the first and second crystal embodiment connected together to form an enjoining cavity which includes a crystalline temperature resonator and a crystalline reference resonator for pressure reference. This is then used to generate temperature data signals and reference signals in response to the frequencies of the crystalline temperature resonator and the crystalline reference resonator.

The above described patents and the prior art suffer from the drawbacks of utilizing too many crystals and the problems associated with multiple crystal transducer designs. As shown in FIG. 1, the prior art has a crystalline sensor device exposed to the pressure P1 and a reference crystalline device enclosed in a pressure proof enclosure. The signals of these crystalline devices are combined by a mixer 1 to form an absolute pressure measuring device. In order to do differential pressure monitoring a second sensor crystalline device and a second reference crystalline device must be combined along with mixer 2. Mixer 3 is then used to get the difference between the output of mixer 1 and the output of mixer 2 to find the signal associated with the pressure differential. Thus, this system uses four crystals with each having their own instabilities and jitter, and three mixers which all have their own error patterns. All of this equipment requires a greater amount of air space and a larger package for insertion into the well to be monitored. Further, another crystal must be added to compensate for temperature variations of the devices and this introduces additional errors into the system and requires an additional amount of housing space.

Hence, there is a need for an eloquently simple differential pressure monitoring device.

BRIEF SUMMARY OF THE INVENTION

A differential pressure monitoring device utilizing two crystalline frequency sensors exposed to different pressures for generating two signals which are combined by a frequency mixer. Two offset based frequency crystal sensors are each exposed to different pressures and the resulting frequencies are mixed to measure the pressure differential between the two crystals. When the crystals are exposed to a common pressure, the crystals have an offset based frequency response that is consistent with pressure. When the two crystals are exposed to pressures, the offset frequencies are mixed together to create a differential frequency that is precisely related to the differential in the pressures placed on the two different crystal sensors.

In accordance with the present invention, an improved pressure monitoring apparatus, device, and method is provided which addresses the drawbacks of the prior art devices and in one of its exemplary forms includes a first crystal and a second crystal which both change resonance frequency with an applied characteristic such as pressure. The signals from these crystals are compared by a mixer to produce a signal corresponding to the value difference of the characteristic being monitored by the first crystal versus the characteristic being monitored by the second crystal.

In accordance with one embodiment of the invention, a first sensing means is provided which is responsive to changes in a characteristic, a second sensing means provided for generating a second signal responsive to the same characteristic but having a signal consistently offset from the first signal when both crystals are exposed to the same value of said characteristic, and a signal receiving means provided for monitoring the difference between the first signal and the second signal.

In accordance with another example of the present invention, the unit is equipped with a first sensing means and a second offset based sensing means separated by an orifice where the first sensing means generates a first signal and the second sensing means generates a second signal and the two signals are combined by a mixer to get a pressure differential across the orifice to monitor the fluid flow rate.

The primary object of the present invention is to create a new crystalline transducer which requires only two crystals for pressure differential monitoring.

A still further object of the present invention is the measuring of the density of the fluid positioning one crystal a known vertical distance from the second crystal.

Other objects and further scope of the applicability of the present invention will become apparent from the detailed description to follow, taken in conjunction with the accompanying drawings wherein like parts are designated by like reference numerals.

BRIEF DESCRIPTION OF THE DRAWINGS

FIG. 4 is a graph of the change in frequency associated with a differential pressure across the first and second pressure monitoring means.

DETAILED DESCRIPTION OF THE PREFERRED EMBODIMENTS

Figure 1:
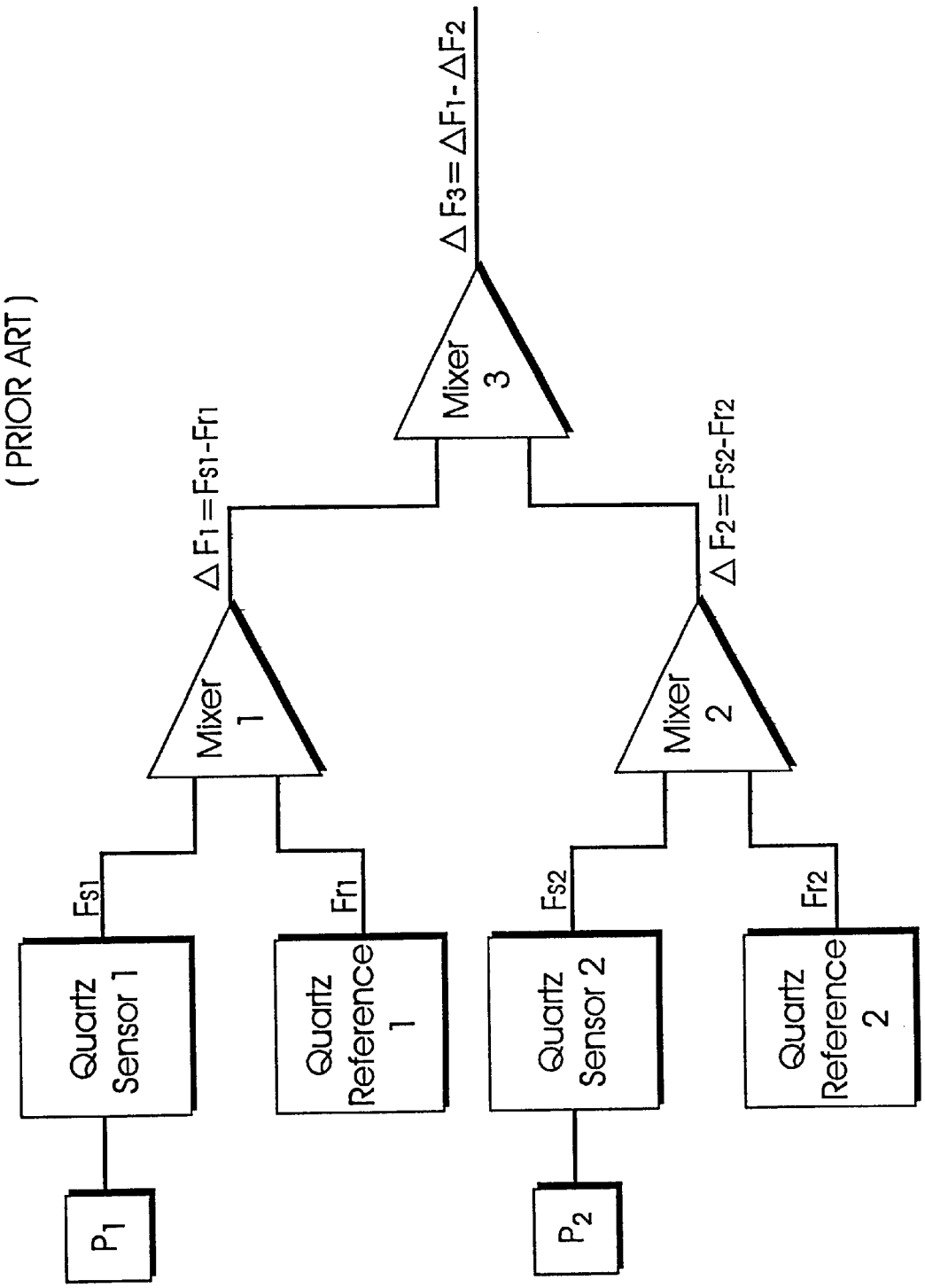
FIG. 1 is a schematic view of the prior art.
Figure 2:
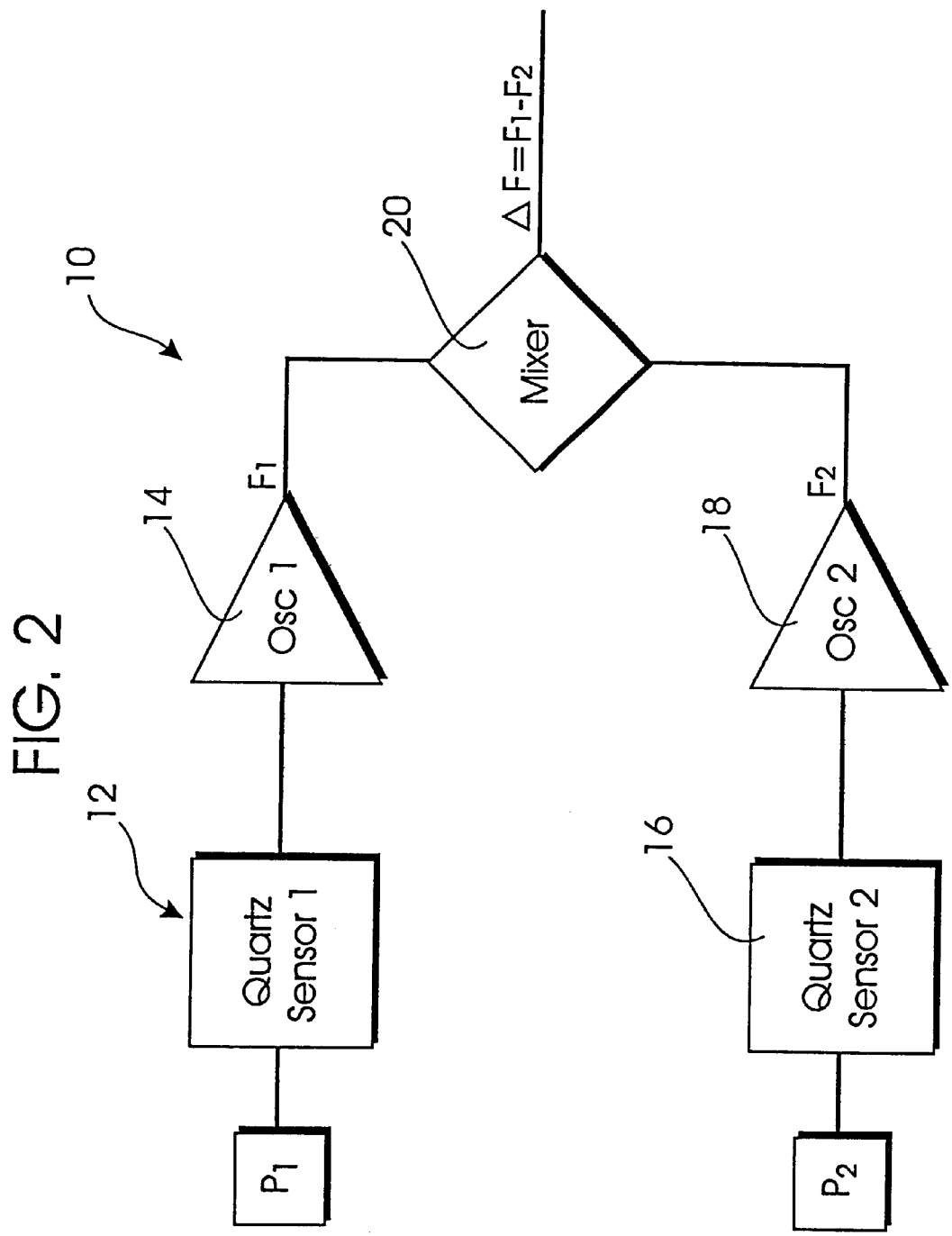
FIG. 2 is a schematic view of the base unit of the invention.

In accordance with an exemplary embodiment of the present invention as shown in FIG. 2, a two-crystal resonator differential pressure gauge apparatus, device, or assembly is generally designated by the reference numeral 10. The differential pressure gauge 10 includes as major components a first frequency crystal 12, a first oscillator 14, a second offset frequency crystal 16, a second oscillator 18, and a mixer 20.

With reference to FIG. 2 of the drawings there is shown the basic embodiment of the invention. A first frequency crystal 12 is exposed to a first pressure P1 which affects the resonant frequency of the crystal. This first frequency crystal 12 uses a first oscillator 14 to create a first frequency F1 in response to the first pressure P1. Similarly, a second offset frequency crystal 16 is exposed to a second pressure P2. This second offset frequency crystal 16 is also connected to a second oscillator 18 which produces a second frequency in proportion to the second pressure P2. The first frequency that is output from the first oscillator 14 and the second frequency which is output from the second oscillator 18 are combined in a mixer 20 to measure the difference in the frequency. This change in frequency is directly related to the change in pressure between the first pressure and the second pressure and is an important characteristic of the present invention. By measuring the difference in pressure between two crystals through the offset of the crystals, and not relying on a reference crystal, very fine measurements of pressure differentials can be made.

In the preferred embodiment, everything about the two sensor crystals 12 and 16 are similar except for a slightly different grind on the second crystal 16 to offset the base frequency. This allows the two crystals to react in the same manner to pressure, temperature, and other external characteristics, and the two crystals will then resonant at approximately 7.2 MHz and 7.15 MHz respectively to create a delta frequency of about 50 KHz. In the preferred embodiment of this invention, the first crystal 12 is a standard crystal as well known in the industry, and the second crystal 16 is an offset base frequency crystal in order to get a differential between the first frequency associated with the first crystal 12 and the second frequency associated with the second crystal 16. This offset based frequency allows for a measurement of how the pressure affects the way the crystals change. Basically, the crystals change resonant frequency according to the applied pressure. Since both crystals have similar characteristics other than base frequency, they change frequencies at a fairly similar rate when exposed to external characteristics.

For the preferred embodiment, the two crystals should be chosen so that they have similar reactions to the non-monitored characteristics of the environment in which the monitoring is to occur. Thus, to properly monitor pressure, the crystals should have a similar reaction to the non-monitored characteristics such as temperature. If the temperature affects both crystals in a similar manner, then the effect of temperature on the pressure measurement will only have a minimal effect on the monitored pressure readings.

By constructing a two crystal resonator differential pressure gauge, one may eliminate the prior art reference crystals that would be associated with the first crystal 12 and the second crystal 16. This also allows for the elimination of a mixer for the first crystal and its reference crystal, and a mixer for the second crystal and the second reference crystal. Thus, the present invention allows for a simplified gauge design because it eliminates a first reference crystal, a second reference crystal, and two mixers. Because each of the crystals has its own error patterns, and each of the mixers has its own error patterns, a superior system is designed which reduces the amount of error introduced into the measuring device.

As shown by the following example, the prior art becomes inaccurate when measuring small pressure differentials at high pressures. Because the prior art compares a first crystal against a reference crystal, a large number and its associated error are used as a first pressure measurement. As an example only, we will consider an example where a difference of 2 Hz equals 1 psi and all of the errors are associated with the mixers and no errors are associated with the crystal frequencies. For example, if the differential frequency between the prior art first crystal frequency (5,021,000 Hz) and reference crystal (5,005,000 Hz) is 16,000 Hz with an error of ±2.0 Hz for the first mixer, this results in an actual reading between 15,998 to 16,002 Hz. Then a second large number and its associated error are used for a second pressure measurement. We will assume that the pressure differential is two (2) psi. Thus, the differential frequency between the prior art second crystal frequency (5,021,004 Hz) and reference crystal (5,005,000 Hz) is 16,004 Hz with an error of ±2.0 Hz for the second mixer. This results in an actual reading between 16,002 and 16,006 Hz. When these prior art frequency readings are then mixed together, the error of each signal affects the final value, and the third mixer adds an additional error of ±2.0 Hz. Thus, the final reading for the output of the device is 15,998 to 16,006 with a ±2.0 Hz error for the third mixer which results in the final range of 15,996 to 16,008 Hz. This 12 Hz range means that the accuracy of the pressure readings can only be within ±6 psi, and the 2 psi difference measured by the device is hidden within the error range of the device.

In contrast, if the present method of only utilizing two crystals is used, then the difference in pressure on the first crystal frequency and the second crystal frequency results in a significantly reduced error rate. For example if two crystals are selected with an offset base of 10,000 Hz, and the first crystal were to be selected as shown above, then the first crystal would have a first frequency of 5,021,000 Hz. The second offset crystal would have an offset frequency of 10,000 Hz and a pressure differential reading of 4 Hz to have a total value of 5,031,004 Hz. When these are combined with a mixer, assuming the same error rate, the difference will be 10,004 Hz with an error range of ±2.0 Hz, so the final reading is 10,002 to 10,006 Hz. This 4 Hz range is equivalent to a 2 psi accuracy range for the new device, and this is a significant improvement over the prior art accuracy of ±6 psi. If the error rates of the crystals were added in, it is easily understood that four crystals will introduce a greater error range than only two crystals. Therefore, the present invention improves the accuracy readings for differential pressure monitoring. Please note that these numbers have been used for illustrative purposes only and are not meant to limit the scope or applicability of the present invention and should not be read as limiting the present invention in any manner.

Figure 3:
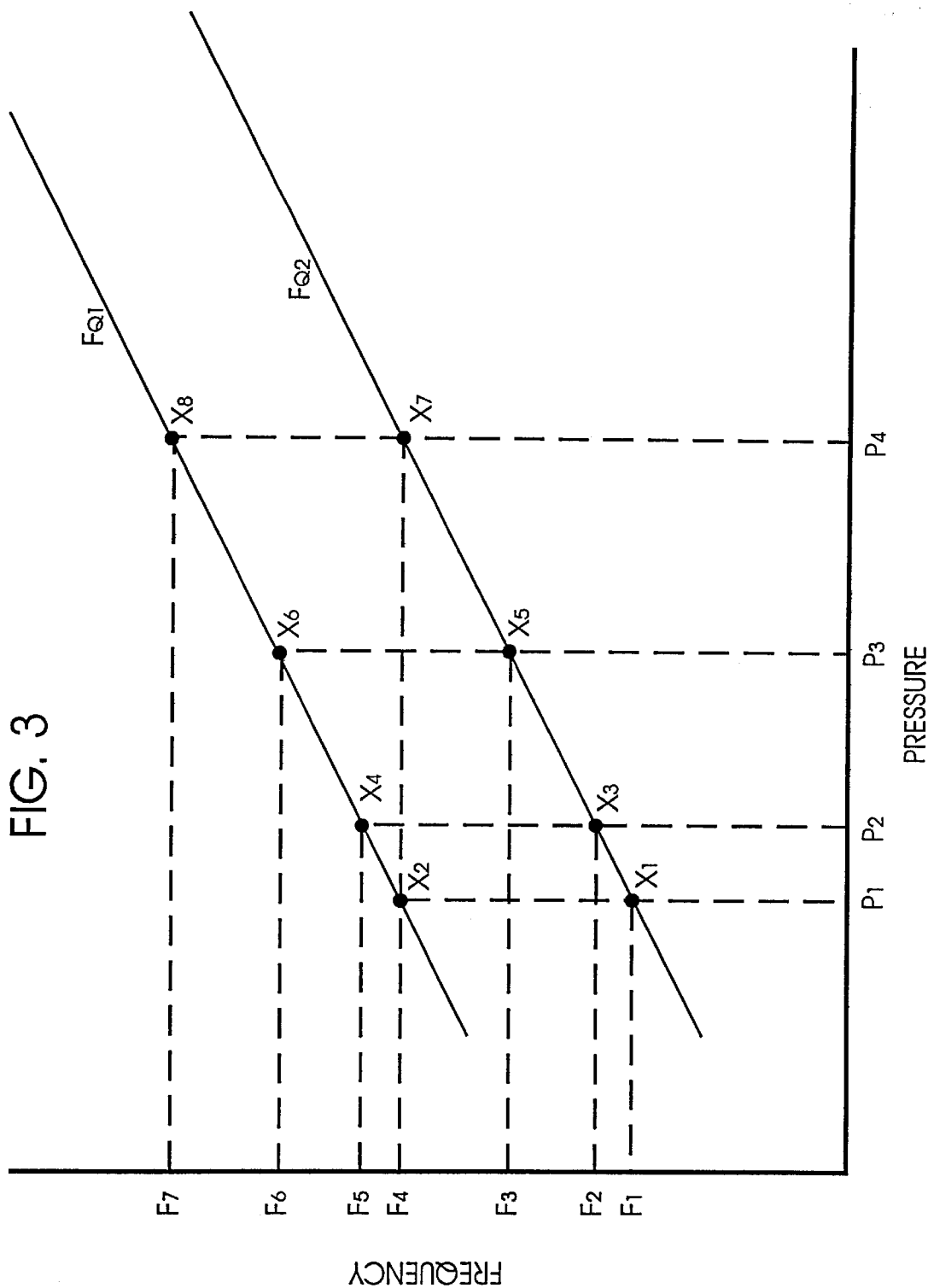
FIG. 3 is a graph of the frequency characteristics of the crystals of the present invention.

As shown in FIG. 3 of the drawings, a first frequency F1 is associated with a second crystal 16 at a pressure P1. A second frequency F2 is associated with pressure P2. A first frequency FQ1 and a second frequency FQ2 are plotted on a frequency pressure graph. FQ1 is the frequency output of the first crystal 12 and first oscillator 14. FQ2 is the output of the second crystal 16 and the second oscillator 18. As shown in FIG. 3, the difference between a point on the FQ1 line and a point on the FQ2 line is associated with the output of the mixer 20. As shown by the graph in FIG. 3, FQ1 and FQ2 are offset by a substantially consistent frequency.

An example of the working embodiment of the present invention can be understood from the following description. If the output of first crystal 12 as represented by FQ1 were to be monitored at a pressure P2, then the resulting frequency F5 at pressure P2 would be found at point X4. Similarly, if the output of second crystal 16 as represented by FQ2 were to be found on the chart in FIG. 3, the frequency of the second crystal at pressure P2 would be frequency X3. Thus, if both the first crystal 12 and the second crystal 16 were held at pressure P2, the difference between the output of the first crystal FQ1 and the output of the second crystal FQ2 would be represented by the distance between the points X4 and X3. By way of example, we will assume that the measurement X4–X3 equals approximately 10 KHz. Thus, if a frequency difference of 10 KHz is found between FQ1 and FQ2 then we know that both crystals are at approximately the same pressure. If we hold the second crystal at the pressure P2 but increase the pressure on the first crystal to P3 we note that the frequency on the first crystal increases to F6 as shown by the point X6. Thus, it can be seen that the difference between the points X3 and X6 has increased which results in an increase in the frequency differential. Similarly, if we hold the pressure on the second crystal 16 at P2, and decrease the pressure on the first crystal 12 to P1, then the difference between the pressure on the first and second crystals is represented by the distance between the points X2 and X3. As shown by FIG. 3, if the reference of 10 KHz in the distance between X3 and X4, then as the kilohertz increases to 11 or 12 KHz, we know that the pressure on the first crystal 12 has increased over that of the second crystal 16. Similarly, as shown by the graph in FIG. 3, if the reference of 10 KHz is the distance between X3 and X4, then as we decrease the pressure on the first crystal 12 to the point corresponding with X2, we see that a decrease to 8 or 9 kilohertz would show that the pressure has decreased on the first crystal 12.

Two important applications for this device include measuring fluid density at various depths in an oil or gas well, and measuring fluid flow rate through an orifice located down hole.

Fluid density is measured by placing first crystal 12 at a known vertical distance from second crystal 16. The assembly holding these crystals is lowered down the oil or gas well to make measurements at various depths. Fluid density $\rho$ is calculated from the measured differential pressures according to the formula $$\rho = \frac{\Delta P}{gh}$$

where $\Delta P$ represents the pressure differential, $\rho$ represents the density, g represents gravity and h represents the known vertical displacement between the crystals.

Flow rate can be established by measuring the differential pressure across an orifice or other flow restricting device.

While the foregoing detailed description has described several embodiments of the present invention, it is to be understood that the above description is illustrative only and not limiting of the disclosed invention.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed:

1. A characteristic well bore pressure monitoring and calculation apparatus, comprising:
    a singular first frequency signal crystal to generate a first frequency signal responsive to changes in a well bore pressure characteristic;
    a second sensing means with a single offset frequency signal crystal to generate a second frequency signal responsive to changes in said well bore pressure characteristic; and
    a signal receiving means to monitor said first generated frequency signal and said second generated frequency signal and calculate a frequency differential between said first and second signals.

2. The characteristic monitoring apparatus of claim 1, further comprising:
    a flow restriction means intermediately separating said first and said second signal crystals to measure a fluid flow rate.

3. The characteristic monitoring apparatus of claim 1 wherein said first sensing means is positioned within a first dimensioned section of a well bore.

4. The characteristic monitoring apparatus of claim 1 wherein said second sensing means is positioned within a second dimensioned section of a well bore.

5. The characteristic monitoring apparatus of claim 1 wherein said signal receiving means is a frequency signal mixer.

6. A method for measuring a pressure differential over a known vertical displacement in a fluid column, comprising:
    generating a first frequency signal responsive to changes in fluid well bore pressure with one frequency signal crystal;
    generating a second frequency signal responsive to changes in said fluid well bore pressure with one offset frequency signal crystal;
    monitoring said first and said second signal frequencies with a signal mixer; and
    calculating a pressure differential based on said first signal and said second signal frequencies.

7. A method for measuring a fluid flow rate within a well bore comprising:
    exposing a single first frequency signal crystal to a first fluid pressure within a well bore and exposing a single second frequency signal crystal to a second fluid pressure within a well bore;
    generating a first frequency signal responsive to changes in fluid well bore pressure characteristic with said single first frequency signal crystal;
    generating a second frequency signal responsive to changes in said fluid well bore pressure characteristic with said single frequency signal second crystal; and
    monitoring said first and second generated frequency signals and calculating the frequency differential between said frequency signals.

8. The method of claim 7 wherein said first and second fluid pressures are effectuated via a flow restriction means.

9. A method for measuring a fluid density, comprising:
    generating a first frequency signal responsive to changes in a well bore pressure characteristic with a single first frequency signal crystal;
    generating a second frequency signal responsive to changes in said pressure characteristic with a single offset frequency signal crystal, wherein the distance between said first frequency signal crystal and said offset frequency signal crystal is known;
    monitoring said first generated frequency signal and said second generated frequency signal with a signal mixer;
    calculating the pressure differential based on said first and said second generated signal frequencies;
    calculating a fluid density based on said pressure differential and said distance between said first frequency signal crystal and said offset frequency signal crystal.

* * * * *